United States Patent
Moon et al.

(10) Patent No.: US 12,250,958 B2
(45) Date of Patent: Mar. 18, 2025

(54) STABILIZER COMPOSITION FOR STABILIZING LIQUID COMPOSITION CONTAINING COLLAGEN PEPTIDE AND FOOD COMPRISING THE SAME

(71) Applicant: AMOREPACIFIC CORPORATION, Seoul (KR)

(72) Inventors: Changyong Moon, Yongin-si (KR); Minjung Kwon, Yongin-si (KR); Sunghwan Lim, Yongin-si (KR); Chanwoong Park, Yongin-si (KR); Wanki Kim, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 78 days.

(21) Appl. No.: 17/821,217

(22) Filed: Aug. 22, 2022

(65) Prior Publication Data
US 2023/0079544 A1  Mar. 16, 2023

(30) Foreign Application Priority Data
Sep. 13, 2021  (KR) .......................... 10-2021-0121973

(51) Int. Cl.
*A23L 29/00* (2016.01)
*A23L 2/02* (2006.01)
(Continued)

(52) U.S. Cl.
CPC .............. *A23L 29/035* (2016.08); *A23L 2/02* (2013.01); *A23L 2/56* (2013.01); *A23L 2/60* (2013.01);
(Continued)

(58) Field of Classification Search
CPC ........ A23L 27/13; A23L 27/34; A23L 29/284; A23L 2/02; A23L 2/56; A23L 2/60
See application file for complete search history.

(56) References Cited

U.S. PATENT DOCUMENTS 3,873,740 A * 3/1975 Terrell .................. A23L 13/426
426/652
2021/0037872 A1  2/2021  Okada et al.

FOREIGN PATENT DOCUMENTS

JP         5442510 B2    3/2014
JP       2018068118 A    5/2018
(Continued)

OTHER PUBLICATIONS

Joshevska E, Kuzelov A, Kalevska K, Dimitrovska G, Makarijoski B. The Impact of Glucono Delta Lactone (GDL) and Starter Cultures over the Chemical Composition in Fermented Sausages. International Journal of research and Review. Mar. 20, 2021;8(3):148-54 (Year: 2021).*

(Continued)

*Primary Examiner* — Katherine D Leblanc
(74) *Attorney, Agent, or Firm* — Rothwell, Figg, Ernst and Manbeck, P.C.

(57) ABSTRACT

One aspect of the present disclosure is a stabilizer composition for stabilizing a liquid composition containing a collagen peptide having a tripeptide composed of Gly-Pro-Hyp, and a food having the same, and in stabilizer composition for stabilizing a liquid composition containing a collagen peptide according to one aspect of the present disclosure, the stabilizer composition contains glucono-delta-lactone as an active ingredient, a pH is 3.0 to 4.0, the GPH, an indicator ingredient of the collagen peptide, is stabilized, and there is an excellent effect of being able to easily manufacture and distribute as a food with a longer shelf life and a very high preference for the decrease in GPH content as the storage period is prolonged.

5 Claims, 1 Drawing Sheet

(51) Int. Cl.
  *A23L 2/56*     (2006.01)
  *A23L 2/60*     (2006.01)
  *A23L 27/12*    (2016.01)
  *A23L 27/30*    (2016.01)
  *A23L 29/281*   (2016.01)

(52) U.S. Cl.
  CPC .............. *A23L 27/13* (2016.08); *A23L 27/34* (2016.08); *A23L 29/284* (2016.08); *A23V 2002/00* (2013.01)

(56) References Cited

FOREIGN PATENT DOCUMENTS

JP          6555886 B2    8/2019
KR     1020200118187 A   10/2020
WO     WO-2005105138 A2 * 11/2005 ............. A61K 38/39

OTHER PUBLICATIONS

Office Action dated Aug. 30, 2024 issued in corresponding Korean Patent Application No. 10-2021-0121973 with English Translation. (8 pages).

Naver blog, "Elastin Collagen Recommended Absolute Collagen Plus," Apr. 13, 2021, (https://blog.naver.com/baseball_03/222309092925) (27 pages).

Naver blog, "[Hoho Program] What Kinds of Tofu Are There? (Tofu/Soft Tofu/Soft Tofu)," Apr. 12, 2021, (https://blog.naver.com/hehehoho_official/222306981710) (17 pages).

* cited by examiner

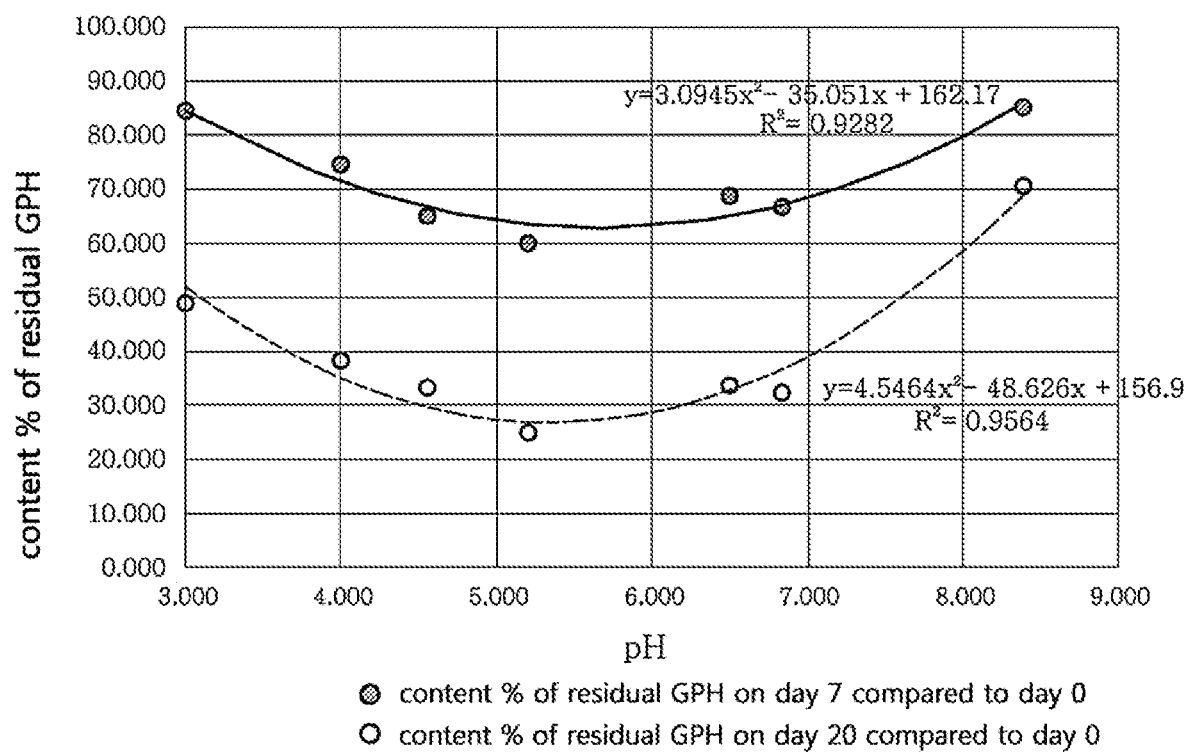

STABILIZER COMPOSITION FOR STABILIZING LIQUID COMPOSITION CONTAINING COLLAGEN PEPTIDE AND FOOD COMPRISING THE SAME

CROSS REFERENCE TO RELATED APPLICATION

The present application claims priority to Korean Patent Application No. 10-2021-0121973, filed Sep. 13, 2021, the entire contents of which is incorporated herein for all purposes by this reference.

BACKGROUND OF THE INVENTION

Field of the Invention

The present specification relates to a stabilizer composition for stabilizing a liquid composition containing a collagen peptide having a tripeptide composed of Gly-Pro-Hyp, and a food having the same.

Description of the Related Art

Collagen is a protein that occupies the largest part quantitatively and functionally in the human body, and refers to an extracellular matrix that forms the skeleton of all cells in the human body, more specifically, a major component of a connective tissue. Human tissues containing a large amount of collagen include skin, bone tissues such as bone and cartilage, tendons, ligaments, and the like. Aging of these tissues causes human aging diseases such as skin wrinkles and sagging and osteoporosis, which is known to be due to a decrease in the amount and function of collagen in the body due to a decrease in collagen synthesis in the tissue.

On the other hand, the connective tissue of the dermis, which is closely related to skin aging, mainly consists of collagen and elastin. The collagen is the main protein of connective tissue and accounts for 70 to 80% of the dry weight of the dermis, giving elasticity and strength to the skin and playing a major role in maintaining moisture. When the function and content of collagen are lowered due to photoaging and natural aging, it adversely affects the skin such as wrinkles, skin roughness, loss of elasticity, and dryness. As such, collagen plays an important role in maintaining skin elasticity and moisture, which can be attributed to protein essential for cell composition and production, and from a nutritional point of view, high quality protein intake is closely related to skin health. The synthesis enhancement and degradation inhibition of collagen has become a major concern in relation to skin beauty and aging inhibition, and there is a demand for the development of cosmetic foods that can promote collagen synthesis while suppressing skin aging.

For this purpose, research on collagen that can be ingested orally has been continuously conducted. In particular, a solid-phase collagen peptide is stable but difficult to ingest, so efforts have been made to prepare the collagen peptide in a liquid form for convenience of intake. However, there is a problem that the liquid collagen peptide becomes unstable. In the case of foods having collagen peptides, glycine-proline-hydroxyproline (Gly-Pro-Hyp, GPH), which is one of the indicator ingredients of collagen peptides, is unstable in liquid. As a liquid product, its shelf life is short, so it is difficult to manufacture and distribute it as a food product.

Accordingly, the present inventors studied a method for stabilizing a collagen peptide, that is, GPH, and developed a method for maintaining the content of GPH at a certain level or more through pH control.

DISCLOSURE

Technical Problem

The present inventors conducted a research on a method for stabilizing a liquid composition containing a collagen peptide having a tripeptide composed of glycine-proline-hydroxyproline (Gly-Pro-Hyp, GPH).

As a result of the research, it was confirmed that when the liquid composition containing a collagen peptide was stabilized with the stabilizer composition containing glucono-delta-lactone as an active ingredient, the pH of the liquid composition was 3.0 to 4.0, and that the GPH in the collagen peptide was stabilized and the food with long shelf life could be manufactured and distributed, so that the present invention was completed.

Accordingly, in one aspect, an object of the present invention is to provide a stabilizer composition for stabilizing a composition containing a collagen peptide having a tripeptide composed of glycine-proline-hydroxyproline (Gly-Pro-Hyp).

In another aspect, an object of the present invention is to provide a food product having the stabilizer composition.

Technical Solution

One aspect of the present invention provides a stabilizer composition for stabilizing a liquid composition containing a collagen peptide, wherein the stabilizer composition contains glucono-delta-lactone as an active ingredient, a pH of the liquid composition after stabilized with the stabilizer composition is 3.0 to 4.0, the collagen peptide has a tripeptide composed of glycine-proline-hydroxyproline (Gly-Pro-Hyp).

Another aspect of the present invention provides a food having the stabilizer composition.

Advantageous Effects

In the stabilizer composition for stabilizing a liquid composition containing a collagen peptide according to one aspect of the present invention, the stabilizer composition contains glucono-delta-lactone as an active ingredient, and the pH of the liquid composition after stabilized with the stabilizer composition is 3.0 to 4.0. When the tripeptide composed of glycine-proline-hydroxyproline (Gly-Pro-Hyp) is stored under severe conditions, specifically, for 7 days or 20 days at 60° C., a content of GPH in the liquid composition after stored is maintained to be more than 70% and 35% or more of the content of GPH in the liquid composition before stored, respectively. As a result, the GPH, an indicator ingredient of the collagen peptide, is stabilized in the composition. There is an excellent effect of being able to easily manufacture and distribute as a food with a longer shelf life and a very high preference because the decrease in GPH content is small as the storage period is prolonged.

BRIEF DESCRIPTION OF THE DRAWINGS

FIG. 1 is a graph showing the content (%) of a residual GPH according to pH when a composition according to an embodiment of the invention is stored at 60° C. for 7 days or 20 days, respectively.

DETAILED DESCRIPTION OF THE INVENTION

Hereinafter, the present invention will be described in detail.

In one aspect, the present invention provides a stabilizer composition for stabilizing a liquid composition containing a collagen peptide, wherein the stabilizer composition contains glucono-delta-lactone as an active ingredient, and the pH of the liquid composition after stabilized with the stabilizer composition is 3.0 to 4.0, and the collagen peptide has a tripeptide composed of glycine-proline-hydroxyproline (Gly-Pro-Hyp).

In one aspect of the present invention, the "collagen peptide" is a peptide having an average molecular weight of 100 to 3,000 Da, and it can be applied as the collagen peptide without limitation as long as amino acids are linked by a peptide bond. Specifically, the collagen peptide may include a tripeptide composed of glycine-proline-hydroxyproline (Gly-Pro-Hyp, GPH).

In one aspect of the present invention, "stabilizing the liquid composition containing a collagen peptide" means that the content and structure of the collagen peptide are stably maintained when heat is applied to the liquid composition containing the collagen peptide. The unstable structure of the collagen peptide means that some of the tripeptides composed of glycine-proline-hydroxyproline (Gly-Pro-Hyp, GPH) are decomposed to exist as dipeptide such as glycine-proline (Gly-Pro), proline-hydroxyproline (Pro-Hyp), or individual amino acids such as glycine (Gly), proline (Pro), and hydroxyproline (Hyp), or include those in which the degraded dipeptide or amino acid is linked to the tripeptide by a peptide bond, for example glycine-proline-hydroxyproline-glycine-proline (Gly-Pro-Hyp-Gly-Pro), or proline-glycine-proline-hydroxyproline (Pro-Gly-Pro-Hyp). On the other hand, specifically, the stabilization of the liquid composition containing a collagen peptide may mean that when the liquid composition is stored at 60° C. for 7 days, the content of the tripeptide composed of glycine-proline-hydroxyproline (Gly-Pro-Hyp) in the liquid composition after stored is maintained to be more than 70% of the content of the tripeptide in the liquid composition before stored. More particularly, the content of the GPH after the liquid composition is stored at 60° C. for 7 days may be maintained to be more than 70%, 71% or more, 72% or more, 73% or more, 74% or more, 75% or more, 76% or more, 77% or more, 78% or more, 79% or more, or 80% or more of the content of the GPH before the liquid composition is stored, but is not limited thereto. Alternatively, specifically, the stabilization of the liquid composition containing a collagen peptide may mean that when the liquid composition is stored at 60° C. for 20 days, the content of the tripeptide composed of glycine-proline-hydroxyproline (Gly-Pro-Hyp) in the liquid composition after stored is maintained to be greater than 35% of the content of the tripeptide in the liquid composition before stored. Particularly, the content of the GPH after the liquid composition is stored at 60° C. for 20 days may be maintained to be 35% or more, 36% or more, 37% or more, 38% or more, 39% or more, 40% or more, 41% or more, 42% or more, 43% or more, 44% or more, or 45% or more of the content of the GPH before the liquid composition is stored, but is not limited thereto. In the case of health functional food, an indicator ingredient of a functional ingredient should be maintained at 80 to 120% during actual distribution. When stored at 60° C. for 7 days or 20 days, the content of tripeptide composed of Gly-Pro-Hyp, which is the indicator ingredient, in the liquid composition is 70% or more and 35% or more, respectively, the content of the indicator ingredient is maintained high during the distribution process, thereby having an effect of having a longer shelf life.

In one aspect of the present invention, the stabilizer composition may contain glucono-delta-lactone as an active ingredient.

In one aspect of the present invention, the glucono-delta-lactone may be contained in an amount of 0.5 to 5% by weight based on the total weight of the stabilizer composition. Specifically, the stabilizer composition contains of the glucono-delta-lactone in an amount of 0.5% by weight or more, 0.6% by weight or more, 0.7% by weight or more, 0.8% by weight or more, 0.9% by weight or more, 1% by weight or more, 1.1% by weight or more, 1.2% by weight or more, 1.3% by weight or more, 1.4% by weight or more, 1.5% by weight or more, 1.6% by weight or more, 1.7% by weight or more, 1.8% by weight or more, 1.9% by weight or more, 2% by weight or more, 2.5% by weight or more, 3% by weight or more, 3.5% by weight or more, 4% by weight or more or 4.5% by weight or more, and 5% by weight or less, 4.5% by weight or less, 4% by weight or less, 3.5% by weight or less, 3% by weight or less, 2.5% by weight or less, 2.4% by weight or less, 2.3% by weight or less, 2.2% by weight or less, 2.1% by weight or less, 2% by weight or less, 1.9% by weight or less, 1.8% by weight or less, 1.7% by weight or less, 1.6% by weight or less, 1.5% by weight or less, 1.4% by weight or less, 1.2% by weight or less, or 1% by weight or less, based on the total weight of the stabilizer composition. However, the content is not limited to the above range as long as the pH of the liquid composition after stabilized with the stabilizer composition is adjusted to 3.0 to 4.0 and the content can maintain high preference without deteriorating the stabilization of the liquid composition containing a collagen peptide. If the glucono-delta-lactone is contained in less than 0.5% by weight based on the total weight of the stabilizer composition, the effect of lowering the pH to 3.0 to 4.0 is insignificant, and if it is contained in excess of 5.0% by weight, an emotional quality may be deteriorated.

In addition, in one aspect of the present invention, the stabilizer composition may further contain acid. Specifically, the additional acid may be an edible acid, and more specifically, the stabilizer composition may include at least one selected from the group consisting of citric acid, malic acid, vitamin C, phosphoric acid. sodium acetate and lactic acid. The stabilizer composition may contain the additional acid in an amount of 0.005 to 1.5% by weight based on the total weight of the stabilizer composition, and specifically, the stabilizer composition contains the additional acid in an amount of 0.005% by weight, 0.01% by weight or more, 0.02% by weight or more, 0.03% by weight or more, 0.04% by weight or more, 0.05% by weight or more, 0.06% by weight or more, 0.07% by weight or more, 0.08% by weight or more, 0.09% by weight or more, 0.1% by weight or more, 0.2% by weight or more, 0.3% by weight or more, 0.4% by weight or more, 0.6% by weight or more, 0.8% by weight or more, 1% by weight or more, 1.2% by weight or more, or 1.4% by weight or more, and 1.5% by weight or less, 1.4% by weight or less, 1.2% by weight or less, 1% by weight or less, 0.8% by weight or less, 0.6% by weight or less, 0.5% by weight or less, 0.4% by weight or less, 0.3% by weight or less, 0.2% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, 0.02% by weight or less, or 0.01% by weight or less, based on the total weight of the stabilizer composition. However, the content is not limited to the above range as long as the pH of the stabilizer composition is adjusted to 3.0 to 4.0 and the content can maintain high preference without deteriorating the stabilization of the liquid composition containing a collagen peptide.

In one aspect of the present invention, the pH of the liquid composition after stabilized with the stabilizer composition may be 3.0 to 4.0, and specifically, the pH of the liquid composition after stabilized with the stabilizer composition may be 3.5 to 4.0. More specifically, the pH of the liquid composition after stabilized with the stabilizer composition may be 3.0 or more, 3.1 or more, 3.2 or more, 3.3 or more, 3.4 or more, 3.5 or more, 3.52 or more, 3.54 or more, 3.56 or more, 3.58 or more, 3.6 or more, 3.62 or more, 3.64 or more, 3.66 or more, 3.68 or more, 3.7 or more, 3.72 or more, 3.74 or more, 3.76 or more, 3.78 or more, 3.8 or more, 3.82 or more, 3.84 or more, 3.86 or more, 3.88 or more, 3.9 or more, 3.92 or more, 3.94 or more, 3.96 or more, or 3.98 or more, and 4.0 or less, 3.98 or less, 3.96 or less, 3.94 or less, 3.92 or less, 3.9 or less, 3.88 or less, 3.86 or less, 3.84 or less, 3.82 or less, 3.8 or less, 3.78 or less, 3.76 or less, 3.74 or less, 3.72 or less, 3.7 or less, 3.68 or less, 3.66 or less, 3.64 or less, 3.62 or less, 3.6 or less, 3.58 or less, 3.56 or less, 3.54 or less, 3.52 or less, 3.5 or less, 3.4 or less, 3.3 or less, 3.2 or less, or 3.1 or less.

According to an embodiment of the present invention, when the pH of the stabilizer composition is 3.0 to 4.0, and the composition is stored for 7 days or 20 days under severe conditions (60° C.), the content of GPH in the composition after stored is maintained to be more than 70%, 35% or more of the content of GPH in the composition before stored, respectively, so the stability of GPH is improved. In particular, when the pH of the stabilizer composition is adjusted to 3.0 to 4.0 by adding the glucono-delta-lactone, the collagen peptide is stably maintained and very high preference is shown, and thus, it has an excellent effect of being manufactured and distributed as a food (Experimental Examples 1 and 2, FIG. 1 and Table 2).

In one aspect of the present invention, the weight ratio of the collagen peptide and the glucono-delta-lactone may be 1:0.0375 to 3.75, and specifically, the weight ratio of the collagen peptide and the glucono-delta-lactone may be 1:0.0375 or more, 0.05 or more, 0.1 or more, 0.15 or more, 0.2 or more, 0.25 or more, 0.3 or more, 0.31 or more, 0.32 or more, 0.33 or more, 0.34 or more, 0.35 or more, 0.36 or more, 0.37 or more, 0.375 or more, 0.38 or more, 0.39 or more, 0.4 or more, 0.5 or more, 0.6 or more, 0.7 or more, 0.8 or more, 0.9 or more, 1 or more, 1.5 or more, 2 or more, 2.5 or more, 3 or more, or 3.5 or more, and 1:3.75 or less, 3.5 or less, 3 or less, 2.5 or less, 2 or less, 1.5 or less, 1 or less, 0.9 or less, 0.8 or less, 0.7 or less, 0.6 or less, 0.5 or less, 0.45 or less, 0.44 or less, 0.43 or less, 0.42 or less, 0.41 or less, 0.4 or less, 0.39 or less, 0.38 or less, 0.375 or less, 0.37 or less, 0.35 or less, 0.2 or less, 0.1 or less, or 0.05 or less. However, the ration is not limited thereto as long as the pH of the liquid composition is 3.0 to 4.0, and the content can maintain high preference without worsening the stabilization of the liquid composition containing a collagen peptide.

In another aspect, the present invention provides a food including a stabilizer composition for stabilizing the liquid composition containing a collagen peptide.

The food according to the present invention may be a health functional food, and specifically, the food may be a health functional food for anti-aging, skin moisturizing, skin wrinkle removing, nail and toenail growth promotion, hair growth promotion, joint elasticity improvement, bone disease improvement, wound relief or skin health protection from UV-induced skin damage. The food may include the stabilizer composition for stabilizing the liquid composition containing a collagen peptide of the present invention as it is, or other foods or food ingredients, and can be appropriately used according to a commonly used method.

There is no particular limitation on the type of the health functional food. Examples of the food including the stabilizer composition for stabilizing the liquid composition containing a collagen peptide may include meat, sausage, bread, chocolate, candy, snacks, confectionery, pizza, ramen, other noodles, gum, and dairy products including ice cream, various soups, beverages, teas, drinks, alcoholic beverages, and vitamin complexes, and have all health functional foods in the ordinary sense.

The health functional food may be a health drink, and may include various flavoring agents or natural carbohydrates as additional ingredients. The above-mentioned natural carbohydrates may be monosaccharides such as glucose and fructose, disaccharides such as maltose and sucrose, polysaccharides such as dextrin and cyclodextrin, and sugar alcohols such as xylitol, sorbitol, and erythritol. As a sweetener, natural sweeteners such as thaumatin and stevia extract, synthetic sweeteners such as saccharin and aspartame, and the like can be used. The ratio of the natural carbohydrate may be 0.01 to 13.0% by weight, specifically 0.02 to 12.00% by weight, based on the total weight of the food of the present invention.

In addition to the above, the health functional food of the present invention may include various nutrients, vitamins, electrolytes, flavoring agents, colorants, pectic acid and its salts, alginic acid and its salts, organic acids, protective colloidal thickeners, pH adjusters, stabilizers, preservatives, glycerin, alcohol, a carbonation agent used in carbonated beverages, and the like. In addition, it may include fruit juice beverage, vegetable beverage, and the pulp for the production of natural fruit juice. These ingredients may be used independently or in combination. The ratio of these additives may be 0.01 to 10.0% by weight based on the total weight of the food of the present invention.

In another aspect, the present invention may relate to a liquid composition containing a collagen peptide, wherein the composition contains the glucono-delta-lactone, and wherein the collagen peptide has the tripeptide composed of glycine-proline-hydroxyproline (Gly-Pro-Hyp).

In one aspect of the present invention, the composition may further contain one or more selected from the group consisting of xylitol, lemon concentrate, flavoring and purified water, and specifically, the composition may further contain xylitol, lemon concentrate, flavoring and purified water.

In one aspect of the present invention, when the liquid composition containing a collagen peptide is stored at 60° C. for 7 days, the content of the tripeptide composed of glycine-proline-hydroxyproline (Gly-Pro-Hyp) in the liquid composition after stored may be maintained to be more than 70% of the content of the tripeptide in the liquid composition before stored. Particularly, the content of the GPH after the liquid composition is stored at 60° C. for 7 days may be maintained to be more than 70%, 71% or more, 72% or more, 73% or more, 74% or more, 75% or more, 76% or more, 77% or more, 78% or more, 79% or more, or 80% or more of the content of the before the liquid composition is stored, but is not limited to thereto. Alternatively, specifically, when the liquid composition containing a collagen peptide is stored at 60° C. for 20 days, the content of the tripeptide composed of glycine-proline-hydroxyproline (Gly-Pro-Hyp) in the liquid composition after stored may be maintained to be 35% or more of the content of the tripeptide in the liquid composition before stored. Particularly, the content of the GPH after the liquid composition is stored at 60° C. for 20 days may be maintained to be 35% or more, 36% or more, 37% or more, 38% or more, 39% or more, 40% or more, 41% or more, 42% or more, 43% or more, 44% or more, or 45% or more of the content of the GPH before the liquid composition is stored, but is not limited thereto. In the case of health functional food, an indicator ingredient of a functional ingredient should be maintained at 80 to 120% during actual distribution. When stored at 60° C. for 7 days or 20 days, the content of the tripeptide composed of Gly-Pro-Hyp, which is the indicator ingredient, in the liquid composition is 70% or more, 35% or more, respectively, the content of the indicator ingredient is maintained high during the distribution process, thereby having an effect of having a longer shelf life.

In one aspect of the present invention, the glucono-delta-lactone may be contained in an amount of 0.5 to 5% by weight based on the total weight of the liquid composition containing a collagen peptide. Specifically, the liquid composition containing a collagen peptide may contain the glucono-delta-lactone in an amount of 0.5% by weight or more, 0.6% by weight or more, 0.7% by weight or more, 0.8% by weight or more, 0.9% by weight or more, 1% by weight or more, 1.1% by weight or more, 1.2% by weight or more, 1.3% by weight or more, 1.4% by weight or more, 1.5% by weight or more, 1.6% by weight or more, 1.7% by weight or more, 1.8% by weight or more, 1.9% by weight or more, 2% by weight or more, 2.5% by weight or more, 3% by weight or more, 3.5% by weight or more, 4% by weight or more, or 4.5% by weight or more, and 5% by weight or less, 4.5% by weight or less, 4% by weight or less, 3.5% by weight or less, 3% by weight or less, 2.5% by weight or less, 2.4% by weight or less, 2.3% by weight or less, 2.2% by weight or less, 2.1% by weight or less, 2% by weight or less, 1.9% by weight or less, 1.8% by weight or less, 1.7% by weight or less, 1.6% by weight or less, 1.5% by weight or less, 1.4% by weight or less, 1.2% by weight or less, or 1% by weight or less, based on the total weight of the liquid composition containing a collagen peptide. However, the content is not limited to thereto as long as the pH of the liquid composition is 3.0 to 4.0, and the content can maintain high preference without deteriorating stabilization of the liquid composition containing a collagen peptide. If the glucono-delta-lactone is contained in an amount of less than 0.5% by weight based on the total weight of the stabilizer composition, the effect of lowering the pH to 3.0 to 4.0 is insignificant, and if the glucono-delta-lactone is contained in an amount of more than 5.0% by weight, the emotional quality may be deteriorated.

Also, in one aspect of the present invention, the liquid composition containing a collagen peptide may further contain an acid, specifically, the additional acid may be an edible acid, and more specifically, the liquid composition containing a collagen peptide may further contain one or more selected from the group consisting of citric acid, malic acid, vitamin C, phosphoric acid, sodium acetate and lactic acid. The liquid composition containing a collagen peptide may contain the additional acid in an amount of 0.005 to 1.5% by weight based on the total weight of the liquid composition containing a collagen peptide. Specifically, the liquid composition containing a collagen peptide may contain the additional acid in an amount of 0.005% by weight or more, 0.01% by weight or more, 0.02% by weight or more, 0.03% by weight or more, 0.04% by weight or more, 0.05% by weight or more, 0.06% by weight or more, 0.07% by weight or more, 0.08% by weight or more, 0.09% by weight or more, 0.1% by weight or more, 0.2% by weight or more, 0.3% by weight or more, 0.4% by weight or more, 0.6% by weight or more, 0.8% by weight or more, 1% by weight or more, 1.2% by weight or more, or 1.4% by weight or more, and 1.5% by weight or less, 1.4% by weight or less, 1.2% by weight or less, 1% by weight or less, 0.8% by weight or less, 0.6% by weight or less, 0.5% by weight or less, 0.4% by weight or less, 0.3% by weight or less, 0.2% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, 0.02% by weight or less or 0.01% by weight or less, based on the total weight of the liquid composition containing a collagen peptide. However, the content is not limited to thereto as long as the pH of the liquid composition containing a collagen peptide is 3.0 to 4.0, and the content can maintain high preference without worsening stabilization of the liquid composition containing a collagen peptide.

In one aspect of the present invention, the pH of the liquid composition containing a collagen peptides may be 3.0 to 4.0, specifically, the pH of the liquid composition containing a collagen peptides may be 3.5 to 4.0. More specifically, the pH of the liquid composition containing a collagen peptide may be 3.0 or more, 3.1 or more, 3.2 or more, 3.3 or more, 3.4 or more, 3.5 or more, 3.52 or more, 3.54 or more, 3.56 or more, 3.58 or more, 3.6 or more, 3.62 or more, 3.64 or more, 3.66 or more, 3.68 or more, 3.7 or more, 3.72 or more, 3.74 or more, 3.76 or more, 3.78 or more, 3.8 or more, 3.82 or more, 3.84 or more, 3.86 or more, 3.88 or more, 3.9 or more, 3.92 or more, 3.94 or more, 3.96 or more, or 3.98 or more, and 4.0 or less, 3.98 or less, 3.96 or less, 3.94 or less, 3.92 or less, 3.9 or less, 3.88 or less, 3.86 or less, 3.84 or less, 3.82 or less, 3.8 or less, 3.78 or less, 3.76 or less, 3.74 or less, 3.72 or less, 3.7 or less, 3.68 or less, 3.66 or less, 3.64 or less, 3.62 or less, 3.6 or less, 3.58 or less, 3.56 or less, 3.54 or less, 3.52 or less, 3.5 or less, 3.4 or less, 3.3 or less, 3.2 or less, or 3.1 or less.

According to an embodiment of the present invention, when the pH of the liquid composition containing a collagen peptide is 3.0 to 4.0, and the liquid composition is stored for 7 days or 20 days under severe conditions (60° C.), the content of GPH in the composition after stored is maintained to be more than 70%, 35% or more of the GPH content in the composition before stored, respectively, so the stability of GPH is improved. In particular, when the pH of the liquid composition containing a collagen peptide is adjusted to 3.0 to 4.0 by containing the glucono-delta-lactone, the collagen peptide is stably maintained and very high preference is shown, and thus, it has an excellent effect of being manufactured and distributed as a food (Experimental Examples 1 and 2, FIG. 1 and Table 2).

In one aspect of the present invention, the weight ratio of the collagen peptide and the glucono-delta-lactone may be 1:0.0375 to 3.75. Specifically, the weight ratio of the collagen peptide and the glucono-delta-lactone may be 1:0.0375 or more, 0.05 or more, 0.1 or more, 0.15 or more, 0.2 or more, 0.25 or more, 0.3 or more, 0.31 or more, 0.32 or more, 0.33 or more, 0.34 or more, 0.35 or more, 0.36 or more, 0.37 or more, 0.375 or more, 0.38 or more, 0.39 or more, 0.4 or more, 0.5 or more, 0.6 or more, 0.7 or more, 0.8 or more, 0.9 or more, 1 or more, 1.5 or more, 2 or more, 2.5 or more, 3 or more, or 3.5 or more, and 1:3.75 or less, 3.5 or less, 3 or less, 2.5 or less, 2 or less, 1.5 or less, 1 or less, 0.9 or less, 0.8 or less, 0.7 or less, 0.6 or less, 0.5 or less, 0.45 or less, 0.44 or less, 0.43 or less, 0.42 or less, 0.41 or less, 0.4 or less, 0.39 or less, 0.38 or less, 0.375 or less, 0.37 or less, 0.35 or less, 0.2 or less, 0.1 or less, or 0.05 or less, but the ratio is not limited to thereto as long as the pH of the liquid composition is 3.0 to 4.0, and the content can maintain high preference without worsening the stabilization of the liquid composition containing a collagen peptide.

In another aspect, the present invention relates to a method for stabilizing a liquid composition containing a collagen peptides. The method includes the step of treating the liquid composition containing a collagen peptides with the glucono-delta-lactone, wherein the pH is controlled to 3.0 to 4.0 by the treatment. The collagen peptide may relate to a stabilization method including the tripeptide composed of glycine-proline-hydroxyproline (Gly-Pro-Hyp).

In another aspect, the present invention provides administrating the stabilizer composition for stabilizing the liquid composition containing a collagen peptide to a subject in need of anti-aging, skin moisturizing, skin wrinkle removing, nail and toenail growth promotion, hair growth promotion, joint elasticity improvement, bone disease improvement, wound relief, or skin health protection from UV-induced skin damage. The stabilizer composition contains the glucono-delta-lactone as an active ingredient, and the liquid composition after stabilized with the stabilizer composition has the pH of 3.0 to 4.0, and the collagen peptide may have the tripeptide composed of glycine-proline-hydroxyproline (Gly-Pro-Hyp) and may be related to a method for anti-aging, skin moisturizing, skin wrinkle removing, nail and toenail growth promotion, hair growth promotion, joint elasticity improvement, bone disease improvement, wound relief, or skin health protection from UV-induced skin damage.

In another aspect, the present invention may relate to the use of the glucono-delta-lactone for preparing a stabilizer composition for stabilizing a liquid composition containing a collagen peptide, the stabilizer composition contains the glucono-delta-lactone as an active ingredient and the pH of the liquid composition after stabilized with the stabilizer composition is 3.0 to 4.0, and the collagen peptide may have the tripeptide composed of glycine-proline-hydroxyproline (Gly-Pro-Hyp).

Hereinafter, the configuration and effect of the present invention will be described in more detail with reference to Examples and Experimental Examples. However, the following Examples, Preparation Examples, and Experimental Examples are provided only for the purpose of illustration to help the understanding of the present invention, and the scope and extent of the present invention are not limited thereto.

[Experimental Example 1] Comparison of Contents of Collagen Peptide According to pH A composition according to an aspect of the present invention was prepared according to the ingredients and contents of Table 1 below, and the contents of collagen peptide according to pH were compared.

The raw materials containing the ingredients of Table 1 below were precisely weighed according to each content, that is, the ingredient mixing ratio, put into a beaker, and then sufficiently dissolved to prepare a composition. In this case, the collagen peptide in Table 1 below was collagen enzyme degradation peptide (Astra Co., Ltd., AP collagen enzyme degradation peptide), and contained GPH (Gly-Pro-Hyp) as an indicator ingredient.

TABLE 1

Unit: % by weight

| Ingredient | Example 1 |
|---|---|
| Collagen peptide | 4 |
| xylitol | 7 |
| Lemon Concentrate | 2 |
| Glucono-delta-lactone | 1.5 |
| Flavoring | 0.5 |
| Purified water | 85 |
| Total | 100 |

After preparing the composition of Example 1, the pH was changed and stored for 7 days and 20 days at 60° C., which was a harsh condition, respectively, and the content of residual GPH was compared in the following manner, and the results were shown in FIG. 1.

Method for Measuring GPH Content

The content of GPH was analyzed by HPLC (high performance liquid chromatography) using water as a solvent, and analyzed under the conditions of a Tskgel ODS-80Ts column, a mobile phase (Trifluoroacetic acid, Acetonitrile) at a flow rate of 1.0 mmL/min.

As shown in FIG. 1, it was confirmed that the longer the storage days, the more the content of residual GPH decreased, and the more acidic or basic the composition was, the more the residual GPH increased. In particular, considering that the pH of the conventional liquid composition containing a collagen peptide was 4.3, when the composition was stored for 7 days, the content of the residual GPH when the pH of the composition was 4.3 was 69.87%, whereas the content of the residual GPH when the pH of the composition was 4.0 was 74.603%, and it was confirmed that despite the difference in pH of only 0.3, the content different of the residual GPH was about 5%. Similarly, when stored for 20 days, the content of the residual GPH was 34.84% when the pH of the composition was 4.3, but the content of the residual GPH was 38.429% when the pH was 4.0. It was confirmed that the content of residual GPH increased by about 4.5% by lowering the pH by 0.3. That is, it was confirmed that when the pH of the composition was 3.0 to 4.0, specifically 3.5 to 4.0, and the composition was stored for 7 days or 20 days under severe conditions (60° C.), the content of GPH in the liquid composition after stored was maintained to be more than 70%, 35% or more of the GPH content in the composition before stored, respectively, so the stability of GPH was improved.

[Experimental Example 2] Comparison of Preference According to the Type of Acid

Through Experimental Example 1, it was confirmed that the more acidic or basic the composition, the more stable the liquid composition containing a collagen peptide containing GPH. The preference was compared according to the type of acid.

Specifically, in order to stabilize the composition containing a collagen peptides in a liquid state, various edible acids of Table 2 below were added instead of the glucono-delta-lactone of Table 1, and the pH of the composition was adjusted to 3.8 through the addition of acid. Then, for each composition, the emotional quality was evaluated for the preference for sour taste and bitter taste, and the results were shown in Table 2 below. Each item was on a 5-point scale, with 5 being the strongest and 1 being the weakest for sour and bitter tastes. In terms of preference, 5 indicates the most delicious and 1 indicates the least taste.

TABLE 2

| | Type of acid | Sour taste | Bitter taste | Preference |
|---|---|---|---|---|
| Example 1 | Glucono-delta-lactone | 2 | 1 | 5 |
| Comparative Example 1 | Citric acid | 5 | 2 | 3 |
| Comparative Example 2 | Malic acid | 4 | 5 | 1 |
| Comparative Example 3 | Vitamin C | 5 | 3 | 1 |
| Comparative Example 4 | Phosphoric acid | 3 | 3 | 2 |
| Comparative Example 5 | Sodium acetate | 5 | 2 | 1 |
| Comparative Example 6 | Lactic acid | 5 | 3 | 2 |

As shown in Table 2, in the case of the composition containing glucono-delta-lactone as an acid, the pH of the liquid composition containing a collagen peptide was 3.8, which improved the stability of the liquid composition and showed the highest preference.

Therefore, the composition containing glucono-delta-lactone as an active ingredient and having the pH of 3.0 to 4.0 according to an aspect of the present invention is a liquid composition containing a collagen peptide wherein, specifically, GPH (Gly-Pro-Hyp), which is an indicator ingredient, is stabilized. Therefore, when stored for a long period of time, there is a small decrease in the GPH content, so the shelf life is longer, and it has a very high preference, so it has an excellent effect that it can be easily manufactured and distributed as food.

What is claimed is:

1. A method for stabilizing a liquid composition comprising a collagen peptide,
    wherein the method comprises adding a stabilizer composition comprising glucono-delta-lactone,
    wherein a pH of the liquid composition after stabilization with the stabilizer composition is 3.0 to 4.0,
    wherein the collagen peptide comprises a tripeptide composed of glycine-proline-hydroxyproline (Gly-Pro-Hyp), and
    wherein the liquid composition is stabilized such that a content of the tripeptide composed of Gly-Pro-Hyp in the liquid composition after storage for 7 days at 60° C. is more than 70% of the content of the tripeptide composed of glycine-proline-hydroxyproline (Gly-Pro-Hyp) in the liquid composition before storage for 7 days at 60° C.

2. The method for stabilizing a liquid composition according to claim 1, wherein the stabilization of the liquid composition comprising a collagen peptide means that a content of the tripeptide composed of glycine-proline-hydroxyproline (Gly-Pro-Hyp) in the liquid composition after stored for 20 days at 60° C. is maintained to be 35% or more of the content of the tripeptide composed of glycine-proline-hydroxyproline (Gly-Pro-Hyp) in the liquid composition before stored for 20 days at 60° C.

3. The method for stabilizing a liquid composition according to claim 1, wherein the glucono-delta-lactone is comprised in an amount of 0.5 to 5% by weight based on a total weight of the liquid composition comprising a collagen peptide.

4. The method for stabilizing a liquid composition according to claim 1, wherein a weight ratio of the collagen peptide and the glucono-delta-lactone is 1:0.0375 to 3.75.

5. The method for stabilizing a liquid composition according to claim 1, wherein the liquid composition further comprises xylitol, lemon concentrate, flavoring and purified water.

* * * * *